United States Patent
Li et al.

(10) Patent No.: US 11,128,210 B2
(45) Date of Patent: Sep. 21, 2021

(54) PFWM CONTROL SYSTEM FOR SWITCHING-MODE POWER SUPPLY CIRCUIT

(71) Applicant: SHANGHAI TUITUO TECHNOLOGY CO., LTD., Shanghai (CN)

(72) Inventors: Renhong Li, Shanghai (CN); Zhuo Shen, Shanghai (CN)

(73) Assignee: SHANGHAI TUITUO TECHNOLOGY CO., LTD, Shanghai (CN)

(*) Notice: Subject to any disclaimer, the term of this patent is extended or adjusted under 35 U.S.C. 154(b) by 0 days.

(21) Appl. No.: 16/915,193

(22) Filed: Jun. 29, 2020

(65) Prior Publication Data

US 2020/0328668 A1 Oct. 15, 2020

Related U.S. Application Data

(63) Continuation of application No. PCT/CN2019/083638, filed on Apr. 22, 2019.

(30) Foreign Application Priority Data

Apr. 24, 2018 (CN) .......................... 201810372935.0

(51) Int. Cl.
  *H02M 1/08* (2006.01)
  *H02M 3/335* (2006.01)
  *H02M 1/00* (2006.01)
(52) U.S. Cl.
  CPC ......... *H02M 1/08* (2013.01); *H02M 3/33523* (2013.01); *H02M 1/0009* (2021.05)

(58) Field of Classification Search
  CPC .... H02M 1/08; H02M 1/0009; H02M 1/4258; H02M 1/4291; H02M 3/335;
  (Continued)

(56) References Cited

U.S. PATENT DOCUMENTS 9,601,990 B2   3/2017 Jin
10,498,224 B2 * 12/2019 Li ....................... H02M 1/4225
(Continued)

FOREIGN PATENT DOCUMENTS

CN       101577488 A     11/2009
CN       102082495 A      6/2011
(Continued)

*Primary Examiner* — Yemane Mehari
(74) *Attorney, Agent, or Firm* — Muncy, Geissler, Olds & Lowe, P.C.

(57) ABSTRACT

A PFWM control system for a switching-mode power supply (SMPS) circuit including a boost conversion circuit and a DC-DC converter. The PFWM control system includes a duty cycle control unit, a frequency control unit and a PFWM waveform generator module. The duty cycle control unit samples an output voltage or current or power of the DC-DC converter, and calculates a duty cycle of a switching component of the SMPS. The frequency control unit samples an input or output voltage of the boost conversion circuit, and calculates an operation frequency of the switching component. The PFWM waveform generator module synthesizes a PFWM drive signal according to the duty cycle and operation frequency. The PFWM drive signal drives switching component of the boost conversion circuit and the DC-DC converter, so as to control an output voltage, an output current, or an output power provided to a load by the DC-DC converter.

6 Claims, 12 Drawing Sheets

(58) Field of Classification Search
CPC ......... H02M 3/33507; H02M 3/33546; H02M 3/33561; H02M 3/33569; H02M 2001/0009
USPC ......... 363/21.01, 21.02, 21.04, 21.07, 21.09, 363/21.1, 21.17, 21.18
See application file for complete search history.

(56) References Cited

U.S. PATENT DOCUMENTS 10,498,225 B2 * 12/2019 Li ..................... H02M 1/4258
10,498,226 B2 * 12/2019 Li ..................... H02M 3/33569
10,700,612 B2 * 6/2020 Li ..................... H02M 1/083

FOREIGN PATENT DOCUMENTS

| | | |
|---|---|---|
| CN | 103856079 A | 6/2014 |
| CN | 205509881 U | 8/2016 |
| CN | 108512421 A | 9/2018 |
| CN | 108539984 A | 9/2018 |
| JP | 2008178263 A | 7/2008 |
| TW | 201739155 A | 11/2017 |

* cited by examiner

PFWM CONTROL SYSTEM FOR SWITCHING-MODE POWER SUPPLY CIRCUIT

CROSS-REFERENCE TO RELATED APPLICATION

This application is Continuation of International Patent Application No. PCT/CN2019/083638, filed on Apr. 22, 2019, entitled "PFWM CONTROL SYSTEM FOR SWITCHING-MODE POWER SUPPLY CIRCUIT" which claims priority of Chinese Patent Application No. 201810372935.0, filed on Apr. 24, 2018, and the entire disclosures of which are incorporated herein.

TECHNICAL FIELD

The present invention relates to the technical field of power electronics, and in particular, relates to a PFWM control method for switching mode power supply circuit.

BACKGROUND

A switching mode power supply circuit formed by a combination of boost circuit with single ended and double ended DC-DC converter (flyback, forward, buck-boost, push-pull, SEPIC or ZETA) is able to realize voltage boosting and output converting, and also the function of AC power factor correction.

An AC-DC power supply of an electrical equipment that connects to AC power grid line has to satisfy mandatory requirements on current harmonics according to standard IEC61000-3-2. With respect to different equipment or applications, IEC61000-3-2 has correspondingly defined class A, class B, class C and class D limiting standards for current harmonics.

Existing switching mode power supply technology mainly uses below solutions. Class A: for power supply of less than 80 W, requirements can be met without taking measure; for power supply of between 80 W and 120 W, a passive PFC (power factor correction) circuit with passive components (resistor, inductor) is used; and for power supply of over 80 W, an active PFC circuit (namely a conventional boost circuit) is used. Class B: for power supply of less than 100 W, requirements can be met without taking measure; for power supply of between 100 W and 150 W, a passive PFC circuit with passive components (resistor, inductor) is used; and for power supply of over 100 W, an active PFC circuit (namely a conventional boost circuit) is used. Class C: active PFC circuit (conventional boost circuit). Class D: active PFC circuit (conventional boost circuit).

PFC circuits for realizing power factor correction are classified into passive and active ones. Comparisons of their performances are provided below: Resistor passive PFC is easily realized at very low cost, but has a high loss, a high temperature and a low power factor, and thus is neither suitable for high power supplies, nor suitable for Class C and Class D equipment. Inductor passive PFC is also easily realized at low cost, but has a relatively high loss and a low power factor, and thus is also not good enough for high power supplies and class C, class D equipment. A boost circuit (active PFC circuit) usually has a high power factor and a high efficiency, can be designed to meet requirements of Class C and Class D equipment, and is suitable for high, medium and small power applications. However, the circuit is complex with more components, leading to a high cost and a large space occupancy.

The active PFC (boost circuit) shown in FIG. 1 is one of the best power factor correction circuits in terms of performance. A traditional switching mode power supply with an active PFC circuit is consisted of a rectification circuit 500, a boost PFC circuit 400 and a DC-DC converter 300. A practical circuit topology is shown in FIG. 1, wherein the DC-DC converter 300 can be a flyback or forward converter; the boost PFC circuit 400 and the DC-DC converter 300 operate independently and are individually controlled by a PFC feedback PWM control unit 100 and a DC-DC feedback PWM control unit 200. The operation principle of the boost PFC circuit is as follows: 1) when Q200 conducts, inductor L100 is charged by AC input voltage applied on C100; 2) when Q200 cuts off, induced voltage on L100 is superimposed with AC input voltage on C100 to charge C200. Therefore, voltage on C200 is always higher than the AC input voltage, so that the boost circuit is a topology for increasing voltage. The duty of Q200 is controlled by the PFC feedback PWM control unit to stabilize the output voltage on C200, which is normally 380Vdc. The above traditional boost circuit is able to obtain a very high power factor to meet the requirements of IEC61000-3-2, but has below disadvantages: (1) require a complex PFC feedback PWM control circuit to improve the power factor; (2) require an additional power supply circuit for the PWM control circuit for realizing PFC; (3) require an independent switching component and driving circuit, and also a current sensing resistor R100; (4) require a large substrate space and the circuitry design is difficulty; (5) great number of components, and high cost.

Such a combination of boost circuit and DC-DC converter has good performance. However, as two independent circuits are adopted, respective power switching components and respective feedback control and driving units are involved, rendering a high cost and a large size.

Hence, single stage PFC circuit, which is also named as flyback PFC circuit was developed in SMPS technology. The circuit rectifies the AC input voltage in full wave manner and then directly converts the voltage to output by a flyback converter (e.g. shown in FIG. 2). This topology involves only a single feedback control unit and only a single power switching component, greatly lowing the cost and reducing the size. However, as the input PFC capacitor C1 of the circuit has to be selected as a capacitor with very small capacitance to achieve good PFC performance, such a capacitor does not provide energy storage function and cannot provide a long enough hold-up time after power off. As a result, the circuit is not suitable for most of power supply applications in industrial, medical and communication fields, and cannot satisfy EMC mandatory requirements at power grid's voltage dip (IEC61000-4-11). Moreover, as the circuit performs feedback control and voltage regulation to the full-wave rectified AC input waveform on the PFC capacitor C1, a much greater output ripple is generated compared to that in a boost type active PFC circuit including a large energy storage capacitor for outputting a stable voltage. Single stage PFC circuits can only be accepted in power supplies for less than 30 W lighting applications or the like. However, the emitted light contains a large power frequency ripple that is harmful to human sight, so it would be gradually abandoned.

As technology evolves, a SMPS circuit with integrated boost and DC-DC converter controlled by single transistor is developed (e.g. shown in FIG. 3). The circuit relies on a single transistor (switching component) Q1 to simultaneously realize boost and DC-DC conversion, and can obtain high power factor, reduce harmonic current, reduce number of components, save cost, and save SMPS space. Accordingly, a new combined controlling method is needed to replace the conventional PWM control method for independently controlling boost and DC-DC.

If the integrated boost and DC-DC converter with single transistor is controlled by using a PWM control method for conventional DC-DC converter (see FIG. 4), its operating principle is as below: DC-DC converter which is controlled by PWM method, monitors and feedbacks output parameters like voltage or current or power of the DC-DC converter, calculates duty of PWM by automatic control method (for examples PID, zero-pole method), and form PWM driving waveform with a preset frequency f (normally set by control IC) to control turn-on and cut-off of the switching component Q1.

As shown in FIG. 3, when Q1 conducts, storage capacitor C2, switching component Q1 and transformer T1 form a primary-side flyback power loop of the DC-DC converter, and T1 stores energy from DC-DC conversion; simultaneously, PFC capacitor C1, switching component Q1 and boost inductor L1 form a boost loop, and L1 stores energy from boost. When Q1 cuts off, the energy stored in T1 releases to the secondary side and outputs energy to load, so that the flyback conversion is accomplished; voltage induced by the energy stored in the boost inductor L1 is superimposed with input rectified voltage on the boost capacitor C1 to form a boosted voltage to charge the storage capacitor C2 through primary winding Np of T1, so that the boost conversion is accomplished. Utilizing DC-DC converter's PWM control method to control switching component Q1 enables the DC-DC converter to operate in conventional manners and adjust the output through pulse width duty. But there is no feedback and control for the boost circuit, whose PWM driving signal is the same as that for DC-DC. However, there are duty limits for PWM control for all types of DC-DC converters. For example, duty of flyback type is less than 80%, duties of forward, half bridge, full bridge and push-pull types are generally less than 50%. Therefore, duty of the boost circuit is also limited and cannot reach the 100% achievable by conventional boost circuits. As a result, it is not possible to achieve energy conversion at a duty of near 100% when the input AC voltage is close to zero. On the other hand, a portion of energy of the boost discharge loop is released to the output via the transformer T1, so that the voltage on the storage capacitor C2 could possibly be less than peak voltage of the input AC voltage. As a result, at the peak of the input AC voltage, a peak current directly charging the storage capacitor C2 through the rectification component D1 occurs, which leads to distortion of the input current waveform, and causes a problem of insufficiently limited harmonic current. Such problem mostly happens at low input AC conditions (see FIG. 5).

SUMMARY OF THE INVENTION

An objective of the present invention is to provide a PFWM control system for SMPS circuit, to solve the problems of insufficient boost conversion due to limited duty and distortion of PFC input current existed with traditional boost circuits.

To solve the above technical problems, the present invention provides a PFWM control system for a switching mode power supply circuit, the PFWM control system configured to control an output voltage or output current or output power of the switching mode power supply circuit, wherein:

the PFWM control system for the switching mode power supply circuit comprises a duty control unit, a frequency control unit and a PFWM waveform generator module;

the switching mode power supply circuit comprises a boost conversion circuit and a DC-DC converter;

the duty control unit is configured for sampling an output voltage or output current or output power of the DC-DC converter, and calculating an operating duty for a switching component of the switching mode power supply circuit based on results of the sampling;

the frequency control unit is configured for sampling an input voltage or output voltage of the boost conversion circuit, and calculating an operating frequency for the switching component of the switching mode power supply circuit based on results of the sampling;

the PFWM waveform generator module is configured for generating a PFWM driving signal based on the operating duty and the operating frequency;

the PFWM driving signal drives the switching component for the boost conversion circuit and the DC-DC converter, so as to control an output voltage or output current or output power supplied from the DC-DC converter to a load.

Optionally, the duty control unit comprises a first parameter detecting circuit, a first feedback processing module and a PWM control module that are connected in series, wherein:

the first parameter detecting circuit is configured to sample the output voltage or output current or output power of the DC-DC converter, generate a sampling result of the output voltage or output current or output power of the DC-DC converter, and send the sampling result of the output voltage or output current or output power of the DC-DC converter and a corresponding setting value to the first feedback processing module;

the first feedback processing module is configured to compare the sampling result of the output voltage or output current or output power of the DC-DC converter to the corresponding setting value, and calculate a duty value for automatic control based on a comparison result between the sampling result of the output voltage or output current or output power of the DC-DC converter and the corresponding setting value;

the PWM control module is configured to provide the duty value to the PFWM waveform generator module.

Optionally, the frequency control unit comprises a second parameter detecting circuit, a second feedback processing module and a PFM control module that are connected in series, wherein:

the second parameter detecting circuit is configured to sample the input voltage or output voltage of the boost conversion circuit, generate a sampling result of the input voltage or output voltage of the boost conversion circuit, and send the sampling result of the input voltage or output voltage of the boost conversion circuit and a corresponding setting value to the second feedback processing module;

the second feedback processing module is configured to compare the sampling result of the input voltage or output voltage of the boost conversion circuit to the corresponding setting value, and calculates a frequency value for automatic control based on a comparison result between the sampling result of the input voltage or output voltage of the boost conversion circuit and the corresponding setting value;

the PFM control module is configured to provide the frequency value to the PFWM waveform generator module.

Optionally, the frequency control unit further comprises an input voltage phase detecting circuit configured to detect a phase of an input voltage of the boost conversion circuit, generate and send a phase sampling value to the second parameter detecting circuit, wherein the phase sampling value is used to keep a proportional relationship between an instant input voltage of the boost conversion circuit and the frequency value.

Optionally, the switching mode power supply circuit further comprises a resonant current prevention component, and the PFWM control system for the switching mode power supply circuit further comprises a re-processing module, wherein the PFWM waveform generator module is configured to provide the PFWM driving signal to the re-processing module, and the re-processing module is configured to adjust an operating duty and an operating frequency of the resonant current prevention component.

Optionally, the PFWM control system further comprises an AC input voltage monitoring module, an operation and logic processing module, and a maximum duty limiting module, wherein:

the AC input voltage monitoring module is configured to monitor an input voltage of the boost conversion circuit;

the operation and logic processing module is configured to conduct mathematical operation or logic judgement, to obtain a maximum duty for preventing a boost inductor of the boost conversion circuit from saturation;

the maximum duty limiting module is configured to control a duty value provided to the PFWM waveform generator module not to exceed the maximum duty.

In the PFWM control system for SMPS circuit of the present invention, a duty control unit is used to sample output voltage or output current or output power of a DC-DC converter, and adjust an operating duty of a switching component of the SMPS circuit based on the sampling result; and a frequency control unit is used to sample input voltage or output voltage of a boost conversion circuit, and adjust an operating frequency of the switching component of the SMPS circuit based on the sampling result, so that a comprehensive control driving signal not only maintaining the PWM feedback control of the DC-DC converter, but also enabling feedback control of the boost conversion circuit is provided, which solves the problem of insufficiently adjusted output of the boost circuit due to limitation caused by PWM of DC-DC.

DETAILED DESCRIPTION OF EXEMPLARY EMBODIMENTS

Figure 1:
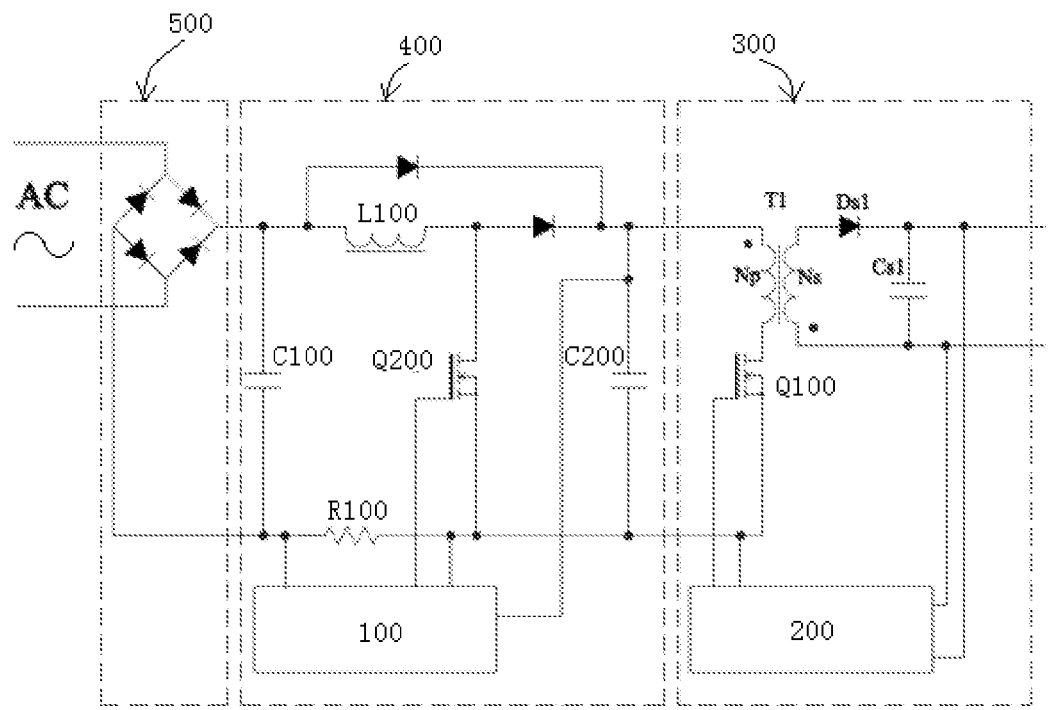
FIGS. 1-3 are schematic diagrams showing conventional boost-PFC flyback SMPS circuits including PFC circuits.
Figure 2:
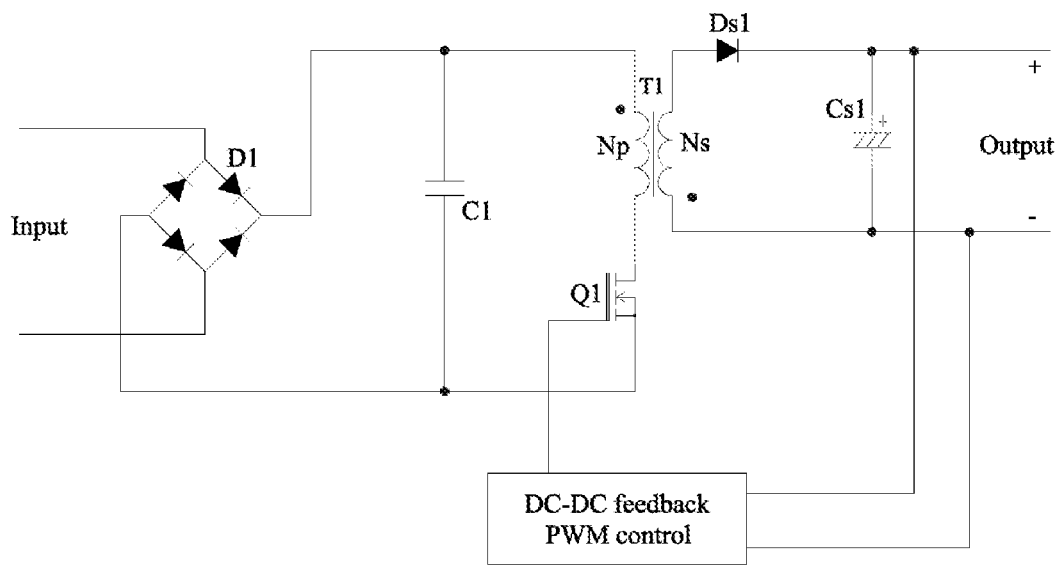

The following embodiments together with figures further describe the PFWM control system for SMPS circuit of the present invention. According to the description and claims, advantages and features of the present invention will become more obvious. It should be noted that attached figures are not precisely proportional to the actual. They are just for the purpose of assisting the description of embodiments of the present invention in an easy and clear manner.

The core concept of the present invention is to provide a PFWM control system for SMPS circuit, to solve the problems of insufficient boost conversion due to limited duty and distortion of PFC input current existed with conventional boost circuits.

To achieve this, the present invention discloses a PFWM control system for a switching mode power supply circuit, the PFWM control system configured to control an output voltage or output current or output power of the switching mode power supply circuit, wherein: the PFWM control system for the switching mode power supply circuit comprises a duty control unit, a frequency control unit and a PFWM waveform generator module; the switching mode power supply circuit comprises a boost conversion circuit and a DC-DC converter; the duty control unit is configured for sampling an output voltage or output current or output power of the DC-DC converter, and calculating an operating duty for a switching component of the switching mode power supply circuit based on results of the sampling; the frequency control unit is configured for sampling an input voltage or output voltage of the boost conversion circuit, and calculating an operating frequency for the switching component of the switching mode power supply circuit based on results of the sampling; the PFWM waveform generator module is configured for generating a PFWM driving signal based on the operating duty and the operating frequency; the PFWM driving signal drives the switching component for the boost conversion circuit and the DC-DC converter, so as to control an output voltage or output current or output power supplied from the DC-DC converter to a load.

A PFWM control system for SMPS circuit according to embodiments of the present invention are shown in FIGS. 6, 8-10, 12-14. The PFWM control system for SMPS circuit controls output voltage or output current or output power of a SMPS circuit 40. The PFWM control system for SMPS circuit comprises a duty control unit 10, a frequency control unit 20, and a PFWM waveform generator module 30. The SMPS circuit 40 comprises a boost conversion circuit and a DC-DC converter. The duty control unit 10 samples output voltage or output current or output power of the DC-DC converter, and calculates operating duty for a switching component of the SMPS circuit 40 based on the sampling result. The frequency control unit 20 samples input voltage or output voltage of the boost conversion circuit, and calculates operating frequency for the switching component of the SMPS circuit 40 based on the sampling result. The PFWM waveform generator module 30 generates a PFWM driving signal by integrating the operating duty and operating frequency. The duty control unit 10 and the frequency control unit 20 could be assigned with different priorities to operate at master-slave mode, to avoid conflict between two channels feedback so as to improve loop stability. Or the gain and phase of feedback of the duty control unit 10 and the frequency control unit 20 can be set as different to distinguish them by their response speed so as to improve stability. The PFWM driving signal drives switching component of the boost conversion circuit and DC-DC converter so as to control the DC-DC converter's output voltage or output current or output power provided to load.

The present invention could use the same method that traditional system uses to control DC-DC converter. The output parameter like voltage, current or power is monitored and fedback, and the duty of PWM is calculated based on automatic control theory (e.g. PID, zero-pole). The output voltage of various DC-DC converter circuits could be defined as the function of Duty, that is Vout=f(Duty), for example:

$$Vout = Vdc * Ns/Np * Duty/(1-Duty) \quad \text{Flyback:}$$

$$Vout = Vdc * Ns/Np * Duty \quad \text{Forward:}$$

$$Vout = Vdc * Duty \quad \text{BUCK:}$$

Wherein, Vdc is the voltage on storage capacitor C2; Ns/Np is a ratio of secondary to primary turns of the transformer. It can be seen that, the output of the DC-DC converter can be adjusted and controlled by duty of PWM.

In order for controlling the boost circuit, parameter status of the boost circuit is monitored, such as input voltage or phase or current, or boost output voltage (voltage on storage capacitor C2), or boost current, and boost output power on storage capacitor C2 is adjusted according to logic judgement or operation or automatic control (PID, zero-pole, etc.), so that output voltage energy is under control. Boost output power is the function of frequency and duty, that is Pout=f (f, Duty).

$$Pout = Vin \times Vdc \times Duty \times (1-Duty)/(2 \times f \times L)$$

Wherein, Pout is boost circuit's average output power; Vin is instant input AC voltage after rectification; L is inductance of boost inductor. Hence, boost conversion circuit's output power could be adjusted through the operating frequency f while Duty has been decided by DC-DC converter.

Duty is calculated relying on DC-DC converter's feedback and control, while operating frequency f is calculated relying on boost circuit's feedback and control, and they are combined into the PFWM driving signal for pulse frequency and width modulation, to simultaneously control and adjust output power of the boost circuit and DC-DC converter.

Figure 3:
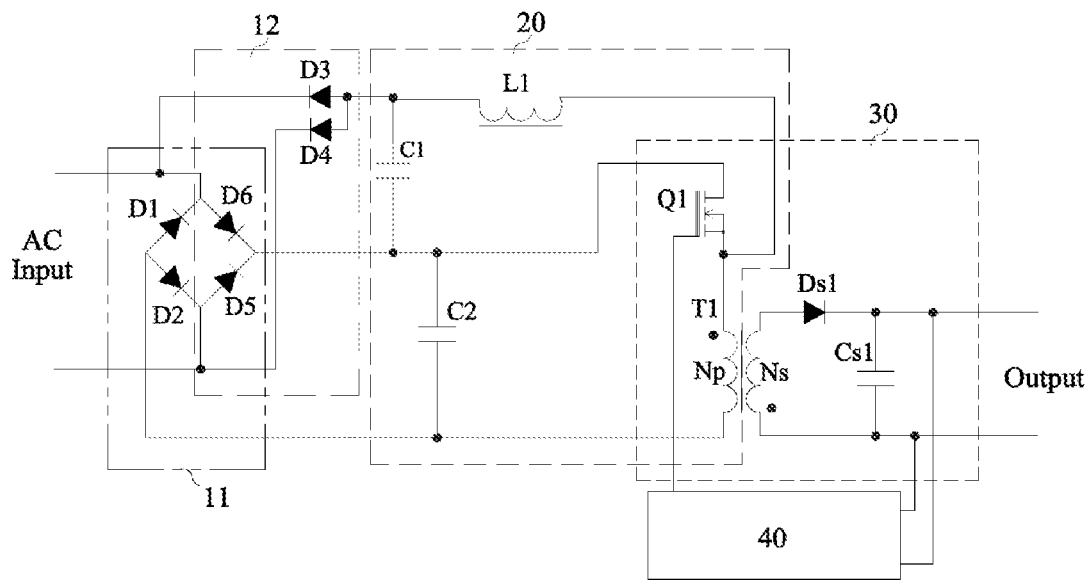
Figure 4:
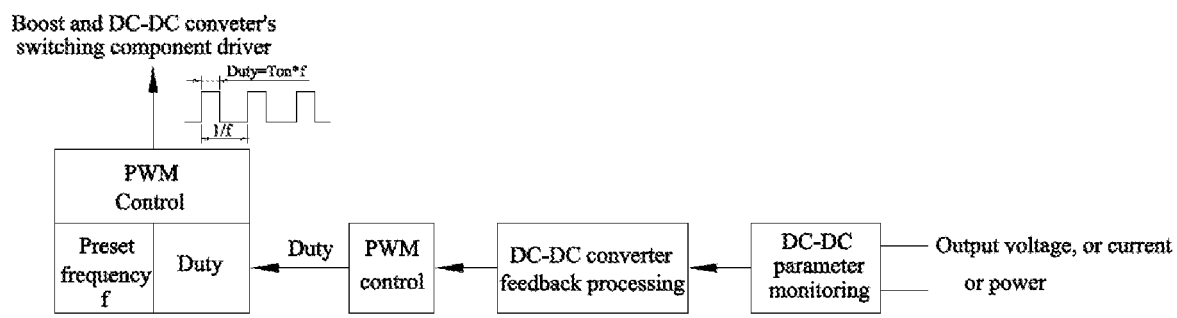
FIG. 4 shows a conventional PWM control system for SMPS circuit.
Figure 5:
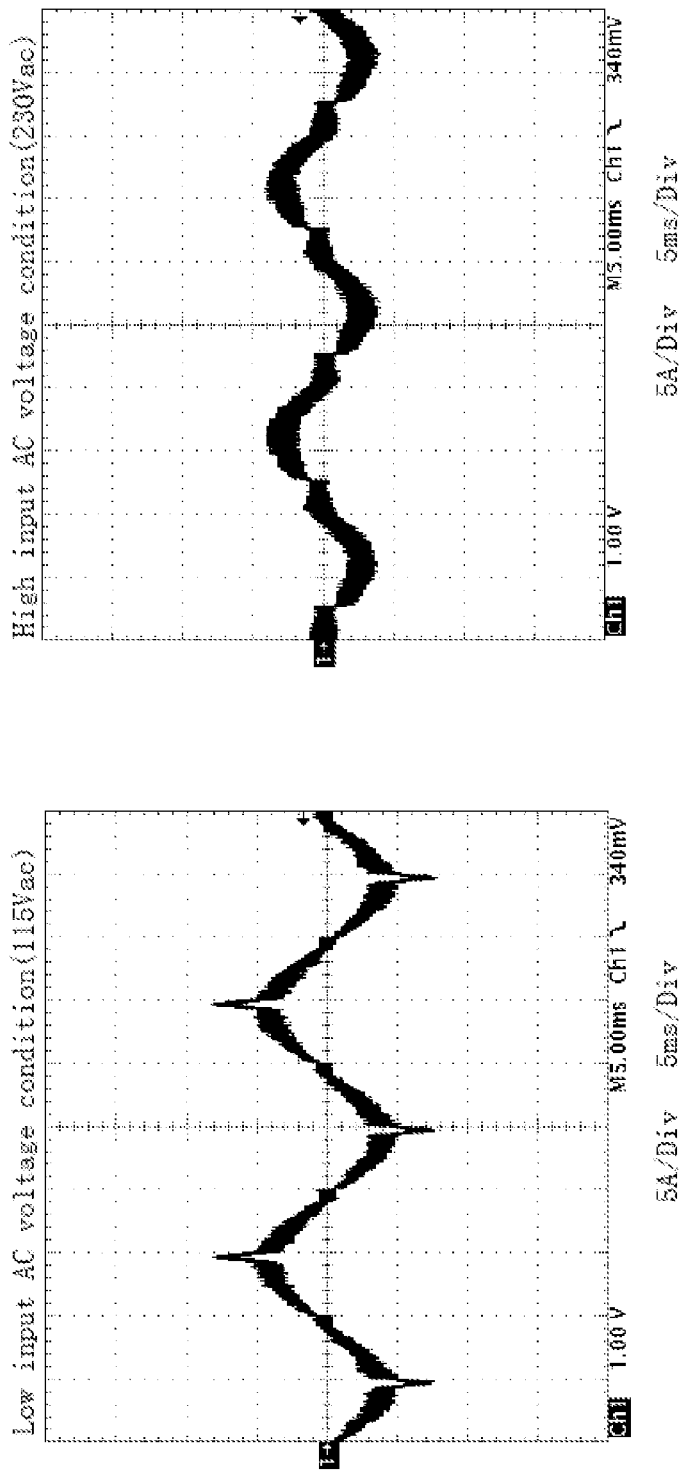
FIG. 5 shows an input current waveform obtained by using conventional PWM control system.
Figure 6:
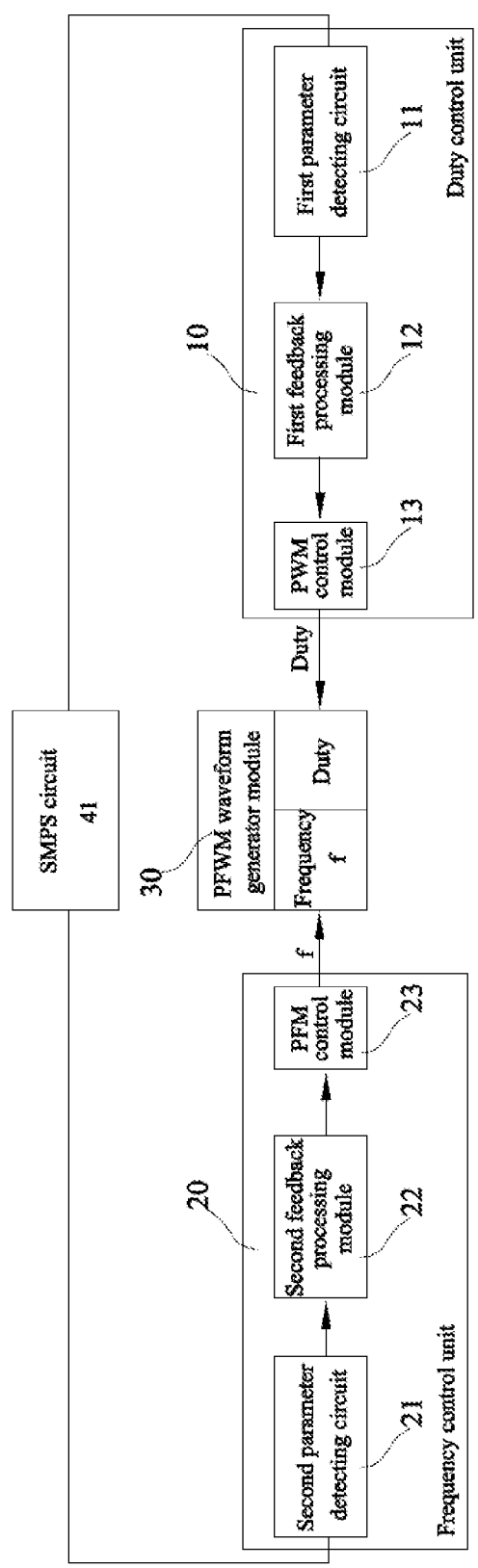
FIG. 6 shows a PFWM control system for SMPS circuit of an embodiment of the present invention.
Figure 7:
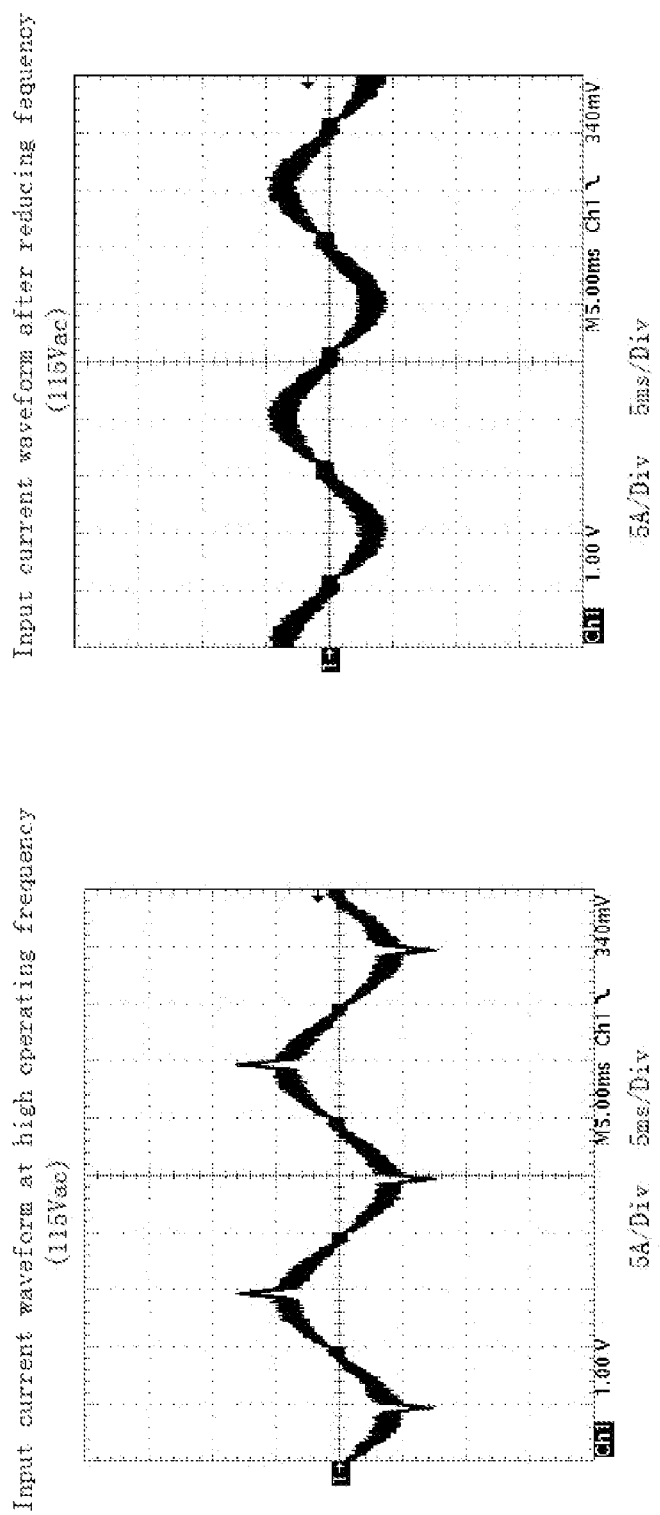
FIG. 7 shows current waveforms respectively obtained by using the PFWM system for SMPS circuit of the present invention and the conventional control system.

According to the present invention, a PFWM signal control method is provided for an integrated SMPS comprising a boost circuit and a PWM type DC-DC converter. The method can simultaneously control boost and DC-DC conversion, and can also achieve PFC function. Traditional boost circuit and DC-DC converter use their respective PWM controllers, which are incapable to control the single-switch type integrated SMPS containing boost circuit and DC-DC converter as shown in FIG. 3. The PFWM method of the present invention not only can drive single-switch type integrated SMPS, but also can drive independent boost circuit and DC-DC converter. The method covers more applications with advantages of cost and size reduction. The present invention also relates to a PFWM control method, in which the boost circuit and DC-DC converter use the same PFWM driving signal which contains duty and frequency modulation, to simultaneously control boost and DC-DC conversion, and to achieve PFC function for AC input application.

As shown in FIGS. 8-10 and 12-14, the integrated SMPS 41 comprises: boost inductor L1, boost capacitor C1, storage capacitor C2, transformer or DC-DC inductor T1, first switching component Q1, output rectification component Ds1, filter capacitor Cs1, first rectification circuit D1 and second rectification circuit D1, D3, D4. Wherein: first switching component could be MOSFET, bi-polar transistor, IGBT, SiC or GaN FET etc.; the first rectification circuit D1 and the storage capacitor C2 form the first rectification loop; the second rectification circuit D1, D3, D4 and the boost capacitor C1 form the second rectification loop; the first rectification circuit D1, the storage capacitor C2 and the boost capacitor C1 are connected at their same voltage polarity. The boost inductor L1, the boost capacitor C1, the storage capacitor C2, the transformer or DC-DC inductor T1 and the first switching component Q1 constitute a boost conversion circuit. The storage capacitor C2, the transformer or DC-DC inductor T1, the first switching component Q1, the output rectification component Ds1 and the filter capacitor Cs1 constitute a DC-DC converter.

When the first switching component Q1 conducts, the boost inductor L1, the boost capacitor C1 and the first switching component Q1 form a first boost loop; the boost inductor L1 stores energy; the storage capacitor C2, the first switching component Q1 and the transformer or DC-DC inductor T1 form a first DC-DC loop.

When the first switching component Q1 cuts off, the boost inductor L1, the boost capacitor C1, the storage capacitor C2 and the transformer or DC-DC inductor T1 form a second boost loop; the transformer or DC-DC inductor T1, the output rectification component Ds1 and the filter capacitor Cs1 form a second DC-DC loop.

The filter capacitor Cs1 supplies energy to the load. The duty control unit 10 outputs duty for the first switching component Q1, and the frequency control unit 20 outputs frequency for the first switching component Q1, so as to control an output voltage or current or power supplied by the DC-DC converter to the load.

Detailed circuit is described as below: the first rectification circuit is connected to two terminals of the storage capacitor C2. The second rectification circuit is connected to two terminals of the storage capacitor C1. The first terminal of the boost capacitor C1 is connected to the first terminal of the storage capacitor C2 and the source of the first switching component Q1. The second terminal of the boost capacitor C1 is connected to the first terminal of the boost inductor L1. The second terminal of the boost inductor L1 is connected to the drain of the first switching component Q1 and the positive input of the DC-DC converter (input terminal of primary winding of transformer T1, or input terminal of Buck-Boost inductor, or input terminal of ZETA inductor, etc.). The second terminal of the storage capacitor C2 is connected to the negative input of the DC-DC converter (output terminal of primary winding of transformer T1, or output terminal of Buck-Boost inductor, or output terminal of ZETA inductor, etc.). The gate of the first switching component Q1 is connected to output of the PFWM waveform generator module 30. Input of the duty control unit 10 is connected to output of the DC-DC converter, namely the duty control unit 10 samples output voltage or output current or output power of the DC-DC converter from its output terminal, and controls operating duty of the first switching component Q1 according to the sampling result, so as to obtain desired output. Input of the frequency control unit 20 is connected to input or output terminal of the boost conversion circuit, namely the frequency control unit 20 samples instant voltage, or effective value, or phase of the boost conversion circuit from its input terminal, or samples effective value of output voltage or output voltage amplitude of the boost conversion circuit from its output terminal, and controls operating frequency of the first switching component Q1 according to the sampling result, so as to obtain desired boost output voltage or power.

Operating principle of the illustrated integrated SMPS (FIGS. 8-10, 12-14) is: Q1 is a switching component of a Forward or Flyback DC-DC converter, and it is also a main switching component of the PFC circuit. When controlled by PFWM, Q1 not only acts as the driver of DC-DC conversion, but also acts as driver of input boost PFC. Operating sequence is described as follows: State 1: when Q1 conducts, boost inductor L1 is charged by AC input voltage on C1 through D3, D4, and stores energy. Simultaneously, Q1 drives transformer T1 of the DC-DC converter. When Q1 conducts, energy in storage capacitor C2 flows through Q1 into primary winding Np of transformer T1, and energy of DC-DC conversion is stored in T1. At the same time, energy in boost capacitor C1, which reflects changes in the instant AC input voltage, flows through Q1 into boost inductor L1, and energy of boost conversion is stored in L1.

State 2: Q1 cuts off, and transformer T1 transfers energy by alternating energy. Induced voltage on L1 is superimposed with rectified AC input voltage on C1 to charge C2 through the primary winding of transformer T1. As there is no releasing loop at the primary side for the energy stored in T1, the energy is released to the load through the secondary winding Ns, and further through the output rectification circuit Ds1 and the filter capacitor Cs1. Thus, completing isolated energy transfer and conversion of the flyback DC-DC converter. Simultaneously, energy stored in boost inductor L1 induces voltage upon Q1's cut-off. The induced voltage is superimposed with the voltage on boost capacitor C1 to charge storage capacitor C2 through the primary winding of T1, accomplishing boost conversion. There is a little portion of energy transferred to secondary side circuit via the transformer T1 without any waste. The boost PFC circuit absorbs energy from the AC input through boost inductor L1 and boost capacitor C1, during intervals of switching on and switching off of the first switching component Q1, according to changes of the AC input voltage and phase, so as to shape AC input current in phase with AC input voltage, to attain PFC function. The requirements of IEC6100-3-2 standard can be satisfied with a greatly reduced component number and cost comparing to traditional active PFC circuits.

State 3: When energy in boost inductor L1 is completely released, and Q1 keeps in the cut-off state, resonant current is generated; L1 and T1 store energy just like in the state when Q1 turns on. If operating frequency is high, the total resonant inductance (L1+T1) will be very large, the corresponding resonant current will be very small, and hence can be omitted as the time is much greater than the time of Q1's cut-off. In this way, the voltage on C2 is greater than the AC input voltage, accomplishing boosting. The duty of Q1 is controlled by the PFWM waveform generator module 30 in order to stabilize the DC-DC voltage output. This PFWM also controls the operation of boost circuit to be in synchronous with the DC-DC converter. In addition, due to the same duty provided by PFWM, voltage on C2 is proportional to duty of DC-DC. Therefore, when the output of DC-DC is controlled by adjusting duty through PFWM feedback control, the voltage of C2 is simultaneously adjusted in the same direction, thereby increasing the gain of feedback and facilitating attenuation of DC-DC output ripple. If the boost inductor L1 operates in a continuous current mode (CCM), resonance of boost inductor and boost capacitor in state 3 would not occur.

Integration of active PFC and flyback DC-DC converter: primary side components, i.e. storage capacitor C2, first switching component Q1 and main transformer T1, secondary side components, i.e. output rectification component Ds1 and filter capacitor Cs1, duty control unit 10 and PFWM waveform generator module 30 constitute a single-ended flyback DC-DC converter. First switching component Q1, boost inductor L1, boost capacitor C1 and storage capacitor C2 constitute a boost type active PFC circuit.

Specifically, in the SMPS circuit, the first rectification circuit includes a first rectification component D1 (e.g. bridge). The second rectification circuit includes the first rectification component D1, a third rectification component D3 and a fourth rectification component D4. The rectification components are all shown as diodes, but can be replaced by MOSFETs.

Dual rectification part: D1 rectifies AC input voltage in the mode of full-wave to store energy in storage capacitor C2. When boost circuit operates, energy output by boost circuit makes the voltage on C2 generally higher than AC input voltage, so that the AC input voltage no longer charges C2. When the energy output by boost circuit is not sufficient to maintain the voltage on C2 higher than the AC input voltage, the AC input voltage could again directly charge C2. The third rectification component D3, the fourth rectification component D4 and the first rectification component constitute another full-wave rectification loop to charge boost capacitor C1. Due to the low capacitance of C1, the voltage on C1 is substantially close to the waveform after full-wave rectification of the AC input voltage. In active boost PFC circuit, the main function of the boost capacitor C1 is for filtering high frequency switching noise and attenuating EMI emission.

Specifically, the duty control unit 10 comprises a first parameter detecting circuit 11, a first feedback processing module 12 and a PWM control module 13 connected in this order. Wherein, the first parameter detecting circuit 11 samples output voltage or output current or output power of the DC-DC converter to generate a sampling result of the output voltage or output current or output power of the DC-DC converter, and sends the sampling result and a setting value to the first feedback processing module 12. The first feedback processing module 12 compares the sampling result of the output voltage or output current or output power of the DC-DC converter with the setting value, and calculates duty of PWM for automatic control based on the comparison between the sampling result of the output voltage or output current or output power of the DC-DC converter and the setting value. The PWM control module 13 sends the duty value to the PFWM waveform generator module 30.

Further, the frequency control unit 20 comprises a second parameter detecting circuit 21, a second feedback processing module 22 and a PFM control module 23 connected in this order, wherein: the second parameter detecting circuit 21 samples input voltage or output voltage of the boost conversion circuit to generate a sampling result of the input voltage or output voltage of the boost conversion circuit, and sends the sampling result of the input voltage or output voltage of the boost conversion circuit and a setting value to the second feedback processing module 22. The second feedback processing module 22 compares the sampling result of the input voltage or output voltage of the boost conversion circuit with the setting value, and calculates the frequency of PFM for automatic control based on the comparison between the sampling result of the input voltage or output voltage of the boost conversion circuit and the setting value. The PFM control module 23 sends the frequency value to the PFWM waveform generator module 30.

Figure 8:
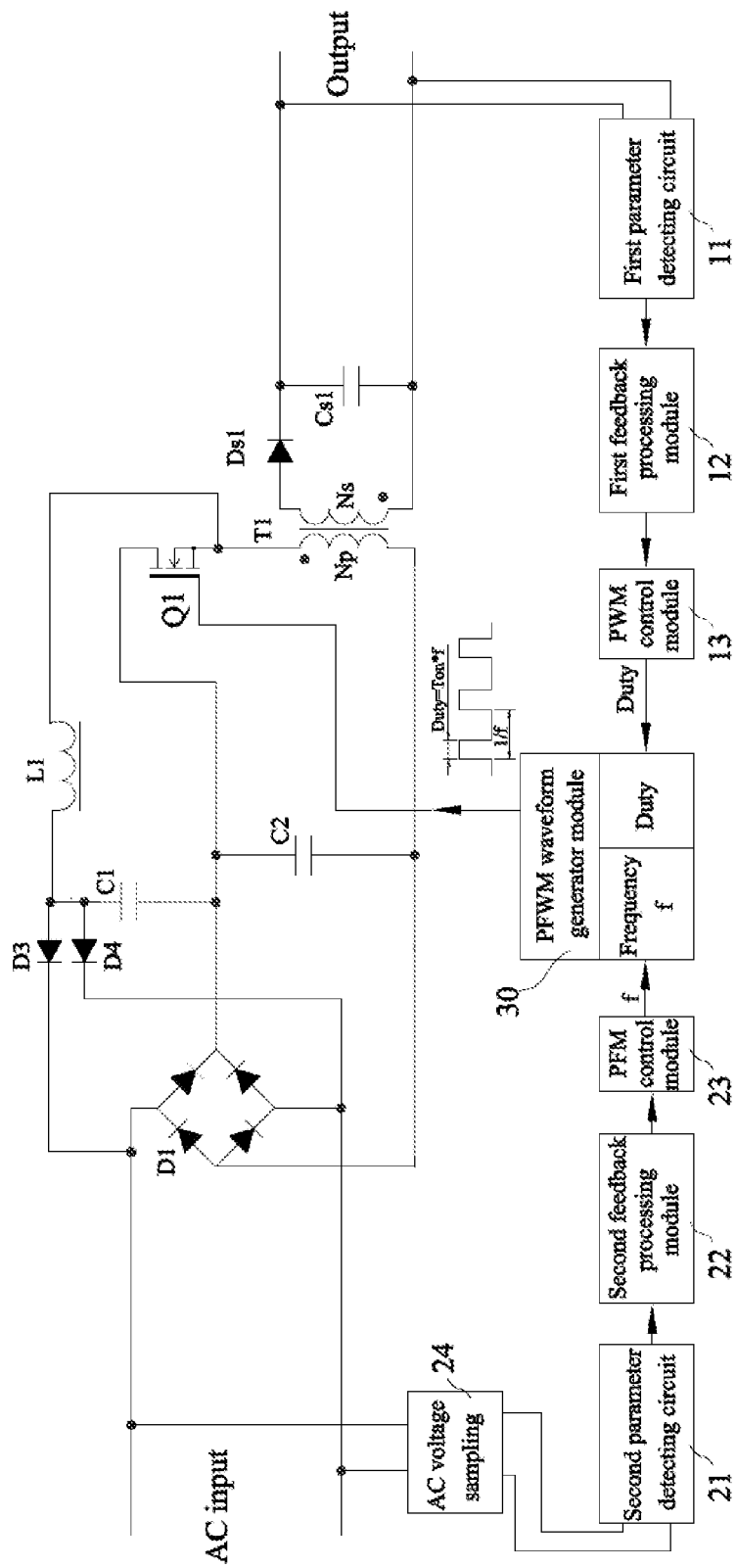
FIG. 8 shows a PFWM control system for SMPS circuit of another embodiment of the present invention.
Figure 11:
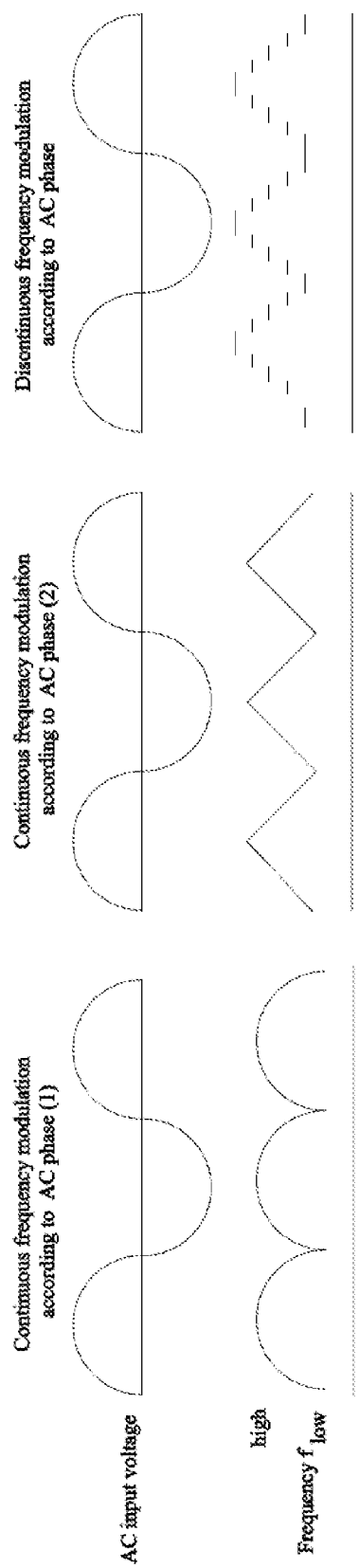
FIG. 11 shows a control method of a PFWM control system for SMPS circuit of another embodiment of the present invention.

As shown in FIG. 8, the frequency control unit 20 further includes an input voltage amplitude sampling circuit 24, which samples the input voltage amplitude of the boost conversion circuit to generate a first sampling value, and sends the first sampling value to the second parameter detecting circuit 21. The frequency value is set to be proportional to the first sampling value. The frequency f is continuously or discontinuously adjusted by monitoring the input voltage (effective value) of the boost circuit and through logical operation. The frequency f is used as PFM driving signal to switch on or off the switching component Q1, to control output power of the boost circuit. The logical operation principle is to slow down frequency at low input voltage so as to increase output power of boost circuit, and to speed up frequency at high input voltage so as to reduce flux density of the transformer, and thereby reducing transformer size. As shown in FIG. 11, such logical operation could be either a continuous function f=f (Vin) like sinusoidal or triangle waveform, or setting f according to the range of the input voltage. Logical operation could be accomplished either by hardware or software.

Figure 9:
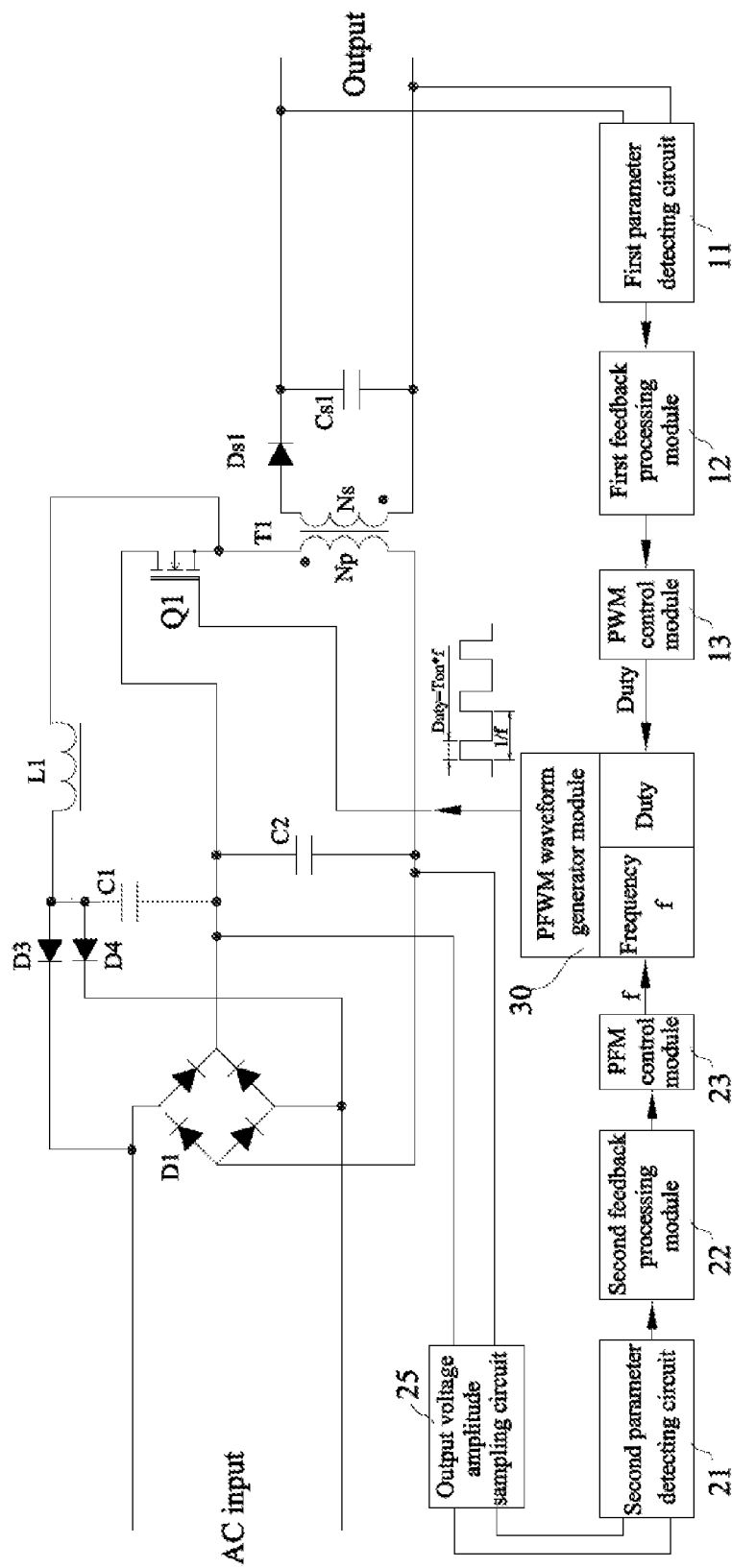
FIG. 9 shows a PFWM control system for SMPS circuit of another embodiment of the present invention.

As shown in FIG. 9, the frequency control unit 20 further comprises an output voltage amplitude sampling circuit 25, which samples output voltage amplitude of the boost conversion circuit to generate a second sampling value, and sends the second sampling value to the second parameter detecting circuit 21. The frequency value is calculated by PID control process according to the second sampling value. Input parameter of boost control is the boost output voltage. By comparing it with the corresponding setting voltage and through automatic control (PID) adjustment, the operating frequency f can be calculated and obtained, and the frequency is integrated with Duty of the flyback DC-DC converter to form the PFWM signal to drive the switching component Q1.

Figure 10:
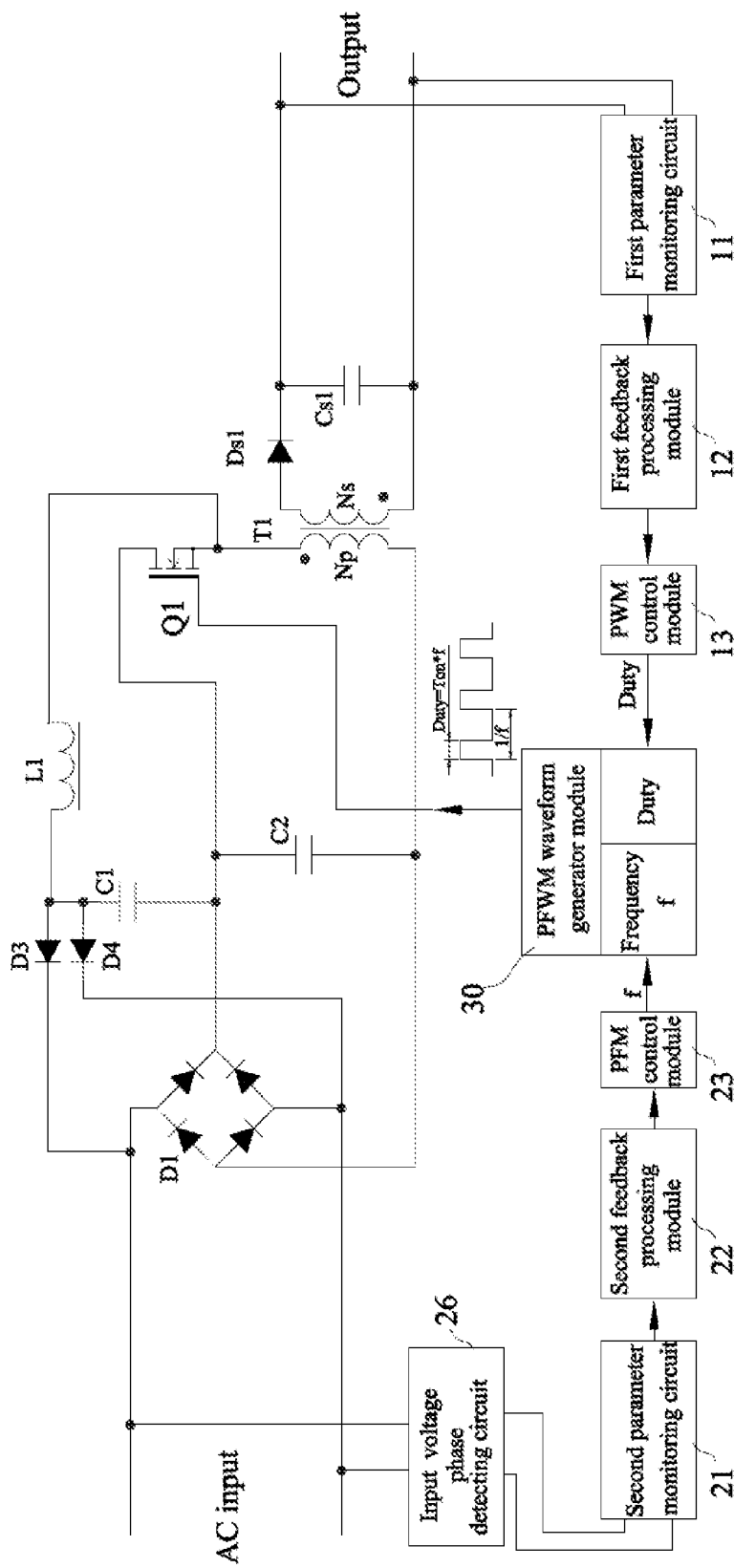
FIG. 10 shows a PFWM control system for SMPS circuit of another embodiment of the present invention.

As shown in FIG. 10, the frequency control unit 20 further comprises an input voltage phase detecting circuit 26, which senses boost conversion circuit's input voltage's phase value to generate a phase sampling value, and sends it to the second parameter monitoring circuit 21. The frequency value is set to be proportional to the instant value of input voltage of the boost conversion circuit according to the phase sampling value. The frequency f is continuously or discontinuously adjusted by detecting boost circuit's input voltage's phase and through logical operation. The frequency f is used as PFM driving signal to switch on or off the switching component Q1, so as to control output power of the boost circuit. The logical operation principle is to slow down the frequency when phase of input AC voltage is close to zero voltage, so as to increase output power of boost circuit, and to speed up frequency when the phase is close to sinusoidal peak, so as to reduce flux density of the transformer and thereby reducing transformer size. As shown in FIG. 11, such logical operation could be either a continuous function f=f (Vin) like sinusoidal or triangle waveform, or setting f according to the range of input voltage. The logical operation could be accomplished either by hardware or software.

Figure 12:
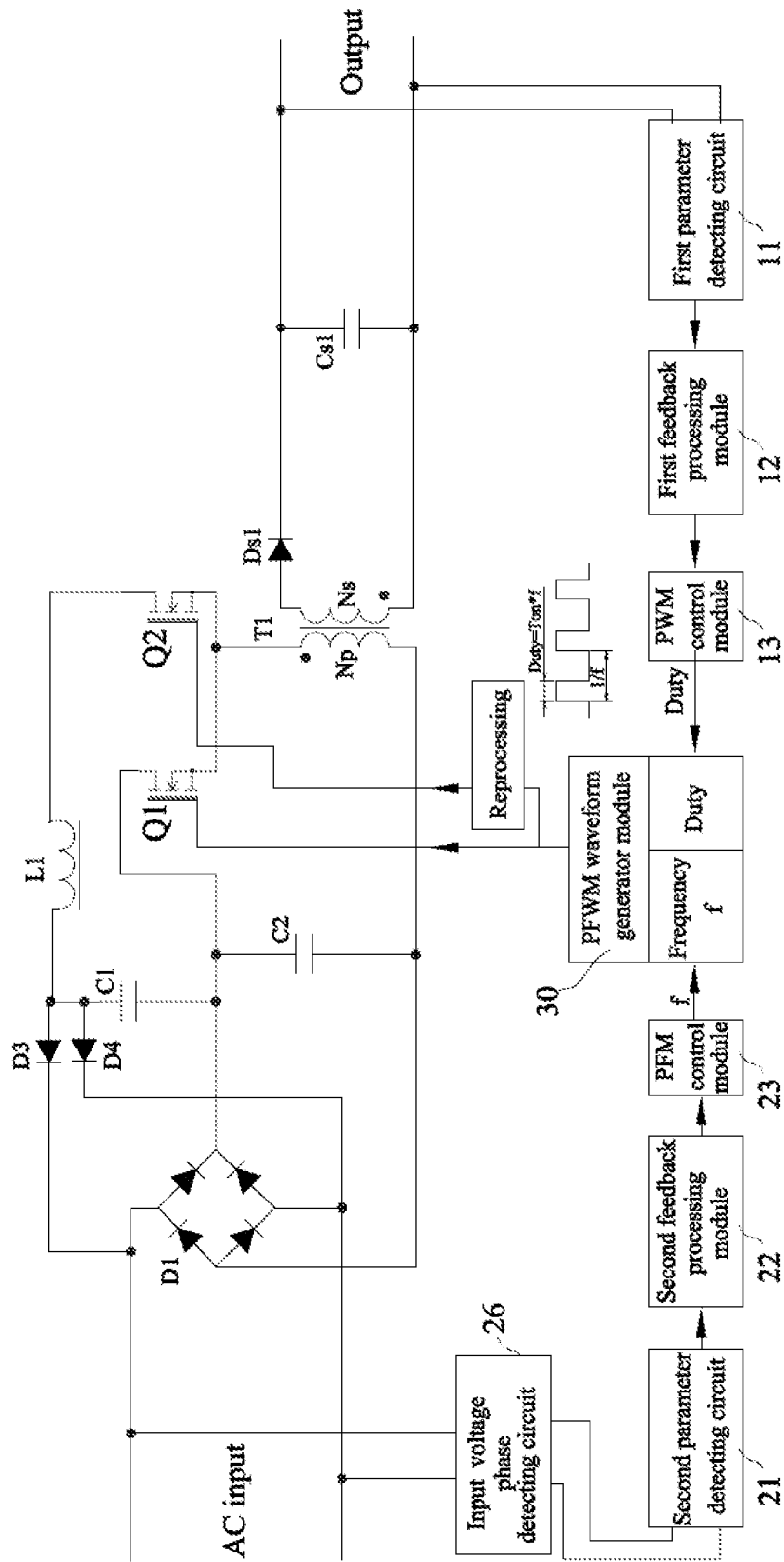
FIG. 12 shows a PFWM control system for SMPS circuit of another embodiment of the present invention.

As shown in FIG. 12, in the PFWM control system of the SMPS circuit, the SMPS circuit 40 further comprises a resonance prevention component, which blocks the charging from the storage capacitor C2 to the boost inductor L1 and boost capacitor C1 after zero return of the current in boost inductor L1, when the boost inductor operates in a discontinuous mode. For example, the resonance prevention component is a second switching component Q2, and the PFWM control system comprises a reprocessing module 31. The PFWM waveform generator module 30 provides the PFWM driving signal to the reprocessing module 31, and the reprocessing module 31 adjusts operating duty and operating frequency of the second switching component Q2. The PFWM driving signal could be duplicated to several channels to meet the design requirement for switching components used with multiple channels of boost or DC-DC conversion circuits. Switching components Q1, Q2 are respectively driven by two channels of PFWM signal. The PFWM driving signal for Q2 could be re-processed to have an extended conduction time compared to that of Q1, so as to reduce conduction impedance of the boost current loop to improve efficiency of the power supply.

Figure 13:
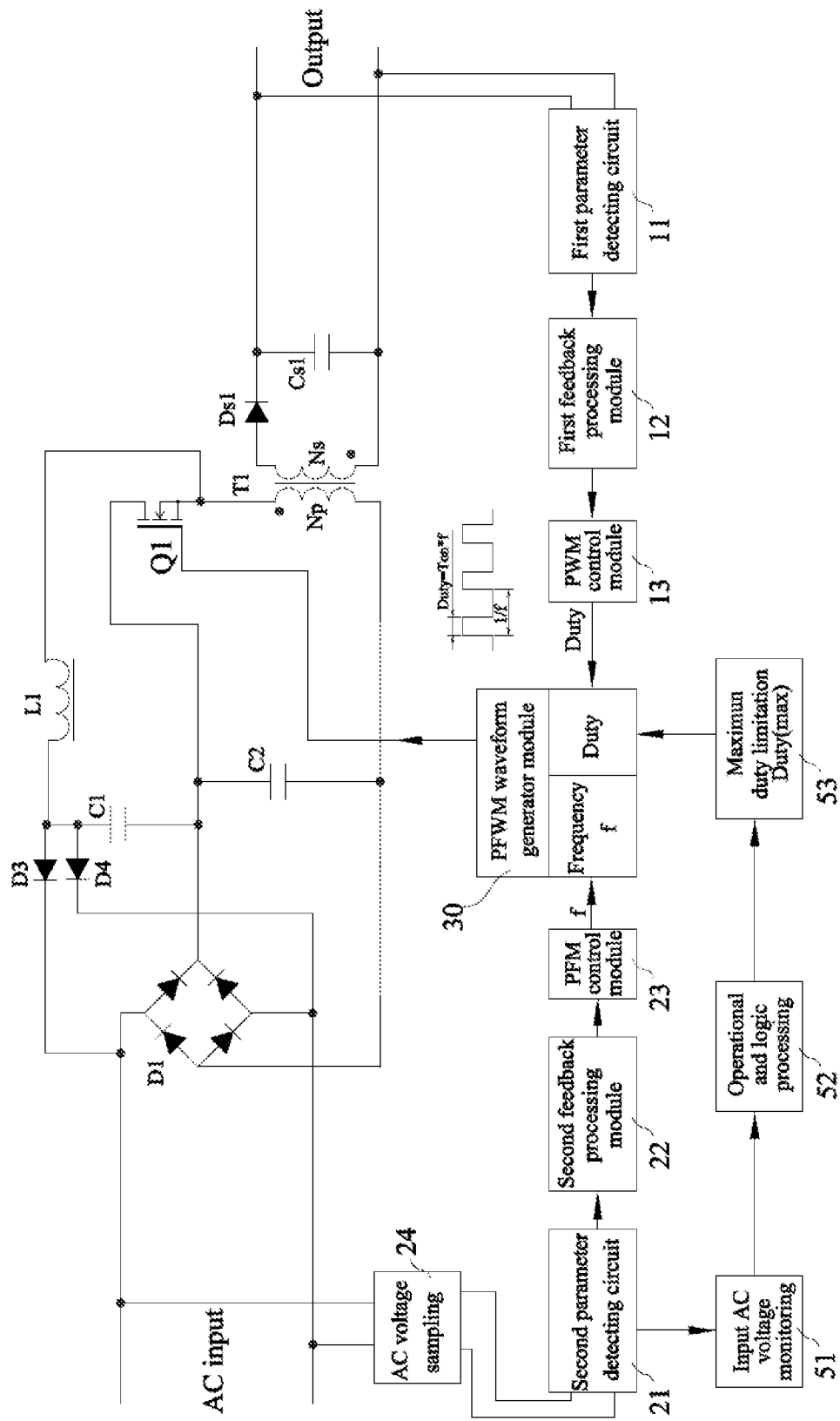
FIG. 13 shows a PFWM control system for SMPS circuit of another embodiment of the present invention.

As shown in FIG. 13, the PFWM system of the SMPS circuit monitors status parameter of the boost circuit like instant input voltage, and obtains, through logic judgement and mathematical operation, the Maximum allowable operating duty, namely Duty(max) to prevent boost inductor L1 from saturation caused by insufficient magnetic reset. The Duty(max) is used to limit the operating duty of the PFWM signal. The PFWM control system of the SMPS circuit further comprises an AC input voltage monitoring module 51, an operational and logic processing module 52 and a maximum duty limiting module 53. The AC input voltage monitoring module 51 monitors the instant AC input voltage of the boost conversion circuit. By calculation and logic judgement, the operational and logic processing module 52 obtains the maximum allowable duty to prevent boost inductor from saturation. The maximum duty limiting module 53 controls the duty of the PFWM waveform generator module not to exceed the maximum allowable duty Duty(max). Boost inductor's magnetic resetting formula is:

$$Vin*Duty=(Vdc+Vout*Np/Ns)*(1-Duty),$$

When Vin is relatively high and close to Vdc, the boost inductor may not be able to reset and leads to saturation. Using the Duty(max) limitation could avoid saturation of the boost inductor. When operation duty is designed to be always less than 50%, then the maximum duty limitation is no longer needed.

Figure 14:
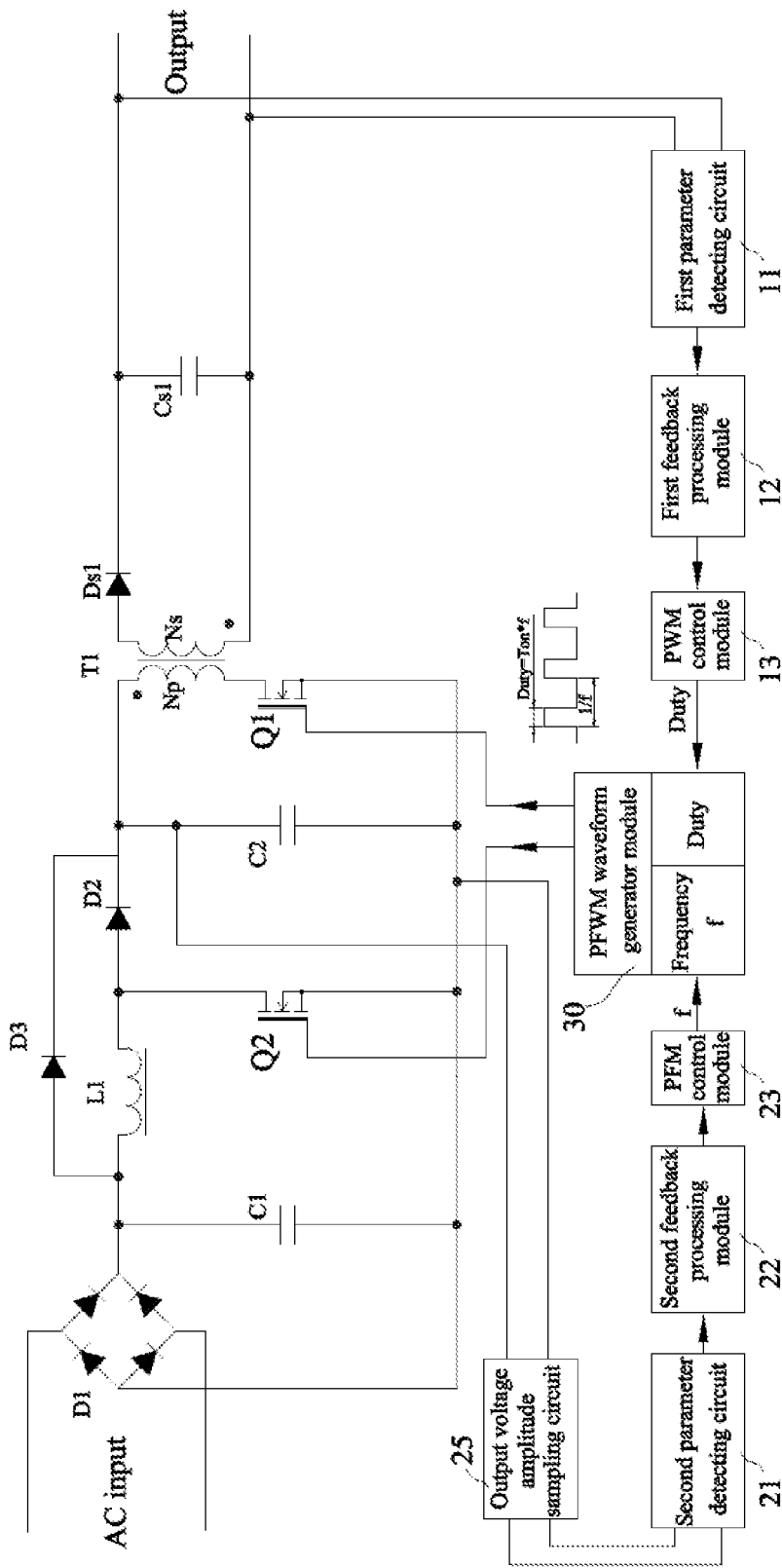
FIG. 14 shows a PFWM control system for SMPS circuit of another embodiment of the present invention.

FIG. 14 illustrates another embodiment of the present invention, which includes two channels of PFWM driving signal to respectively drive switching components of a traditional boost and a flyback DC-DC converter. The operating principle is to use the two channels of PFWM driving signal of the present invention to respectively drive the switching component Q2 of the boost circuit and the switching component Q1 of the DC-DC converter. It differs from traditional combination of boost circuit and DC-DC converter which use PWM control units independent from each other. The embodiment is applicable to traditional combination of boost and DC-DC, extending application scope of the PFWM control system of the present invention.

The present invention also provides a PFWM control method for SMPS circuit, which makes it possible to use the same driving signal to not only control boost step-up, but also control DC-DC conversion in a combined topology of boost circuit and PWM controlled DC-DC converter.

The PFWM control method of SMPS circuit of the present invention is able to generate through feedback operation, a PWM driving signal integrated with frequency modulation for use with combined topology of boost circuit and DC-DC converter. The driving signal is capable of realizing boost conversion of the input voltage and at the same time, can control DC-DC conversion and supply output power.

The control method involves: for the boost circuit, sampling its parameter like amplitude or phase of input voltage, or current, or boost output voltage, etc.; calculating operating frequency f of PFM according to feedback control of parameters like amplitude or phase of voltage or current; and for the DC-DC converter, monitoring its output voltage or current or power; calculating operating duty of PWM according to feedback control; combining the frequency of PFM and the duty of PFM to generate a PFWM control signal with frequency modulation and a certain duty, to drive switching component of boost circuit and DC-DC converter to turn on (conduct) and turn off (cut off), so as to realize boost and conversion of a power supply.

In summary, although different configurations of the switching mode power supply circuit have been detailedly described by the above embodiments, the present invention includes, but is not limited to, the configurations described in the above embodiments. Any alternatives based on the above embodiments are also within the protection scope of the present invention. A person skilled in the art may make inferences based on the above embodiments.

The above embodiments are described in a progressive manner. Each embodiment focuses on the differences from other embodiments, and the same or similar parts between the embodiments may refer to each other. The system disclosed in the embodiments may correspond to the method disclosed in the embodiments and may be described in a relatively simple way. The relevant contents can be referred to from the description of the methods.

The above descriptions are merely descriptions of the preferred embodiments of the present invention, and do not limit the scope of the present invention. Any changes or modifications made by those of ordinary skill in the art based on the above disclosure shall fall within the protection scope of the claims.

What is claimed is:

1. A PFWM control system for a switching mode power supply circuit, the PFWM control system configured to control an output voltage or output current or output power of the switching mode power supply circuit, wherein:
   the PFWM control system for the switching mode power supply circuit comprises a duty control unit, a frequency control unit and a PFWM waveform generator module;
   the switching mode power supply circuit comprises a boost conversion circuit and a DC-DC converter;
   the duty control unit is configured for sampling an output voltage or output current or output power of the DC-DC converter, and calculating an operating duty for a switching component of the switching mode power supply circuit based on results of the sampling;
   the frequency control unit is configured for sampling an input voltage or output voltage of the boost conversion circuit, and calculating an operating frequency for the switching component of the switching mode power supply circuit based on results of the sampling;
   the PFWM waveform generator module is configured for generating a PFWM driving signal based on the operating duty and the operating frequency;
   the PFWM driving signal drives the switching component for the boost conversion circuit and the DC-DC converter, so as to control an output voltage or output current or output power supplied from the DC-DC converter to a load.

2. The PFWM control system for a switching mode power supply circuit of claim 1, wherein the duty control unit comprises a first parameter detecting circuit, a first feedback processing module and a PWM control module that are connected in series, wherein:
   the first parameter detecting circuit is configured to sample the output voltage or output current or output power of the DC-DC converter, generate a sampling result of the output voltage or output current or output power of the DC-DC converter, and send the sampling result of the output voltage or output current or output power of the DC-DC converter and a corresponding setting value to the first feedback processing module;
   the first feedback processing module is configured to compare the sampling result of the output voltage or output current or output power of the DC-DC converter to the corresponding setting value, and calculate a duty value for automatic control based on a comparison result between the sampling result of the output voltage or output current or output power of the DC-DC converter and the corresponding setting value;
   the PWM control module is configured to provide the duty value to the PFWM waveform generator module.

3. The PFWM control system for a switching mode power supply circuit of claim 1, wherein the frequency control unit comprises a second parameter detecting circuit, a second feedback processing module and a PFM control module that are connected in series, wherein:
   the second parameter detecting circuit is configured to sample the input voltage or output voltage of the boost conversion circuit, generate a sampling result of the input voltage or output voltage of the boost conversion circuit, and send the sampling result of the input voltage or output voltage of the boost conversion circuit and a corresponding setting value to the second feedback processing module;
   the second feedback processing module is configured to compare the sampling result of the input voltage or output voltage of the boost conversion circuit to the corresponding setting value, and calculates a frequency value for automatic control based on a comparison result between the sampling result of the input voltage or output voltage of the boost conversion circuit and the corresponding setting value;
   the PFM control module is configured to provide the frequency value to the PFWM waveform generator module.

4. The PFWM control system for a switching mode power supply circuit of claim 3, wherein the frequency control unit further comprises an input voltage phase detecting circuit configured to detect a phase of an input voltage of the boost conversion circuit, generate and send a phase sampling value to the second parameter detecting circuit, wherein the phase sampling value is used to keep a proportional relationship between an instant input voltage of the boost conversion circuit and the frequency value.

5. The PFWM control system for a switching mode power supply circuit of claim 1, wherein the switching mode power supply circuit further comprises a resonant current prevention component, and the PFWM control system for the switching mode power supply circuit further comprises a re-processing module, wherein the PFWM waveform generator module is configured to provide the PFWM driving signal to the re-processing module, and the re-processing module is configured to adjust an operating duty and an operating frequency of the resonant current prevention component.

6. The PFWM control system for a switching mode power supply circuit of claim 1, wherein the PFWM control system further comprises an AC input voltage monitoring module, an operation and logic processing module, and a maximum duty limiting module, wherein:

the AC input voltage monitoring module is configured to monitor an input voltage of the boost conversion circuit;

the operation and logic processing module is configured to conduct mathematical operation or logic judgement, to obtain a maximum duty for preventing a boost inductor of the boost conversion circuit from saturation;

the maximum duty limiting module is configured to control a duty value provided to the PFWM waveform generator module not to exceed the maximum duty.

* * * * *